Jan. 10, 1961 F. A. LEISEY 2,967,946
LIGHT TRANSMISSIVITY CONTROL INSTRUMENT
Filed Oct. 31, 1957 2 Sheets-Sheet 2
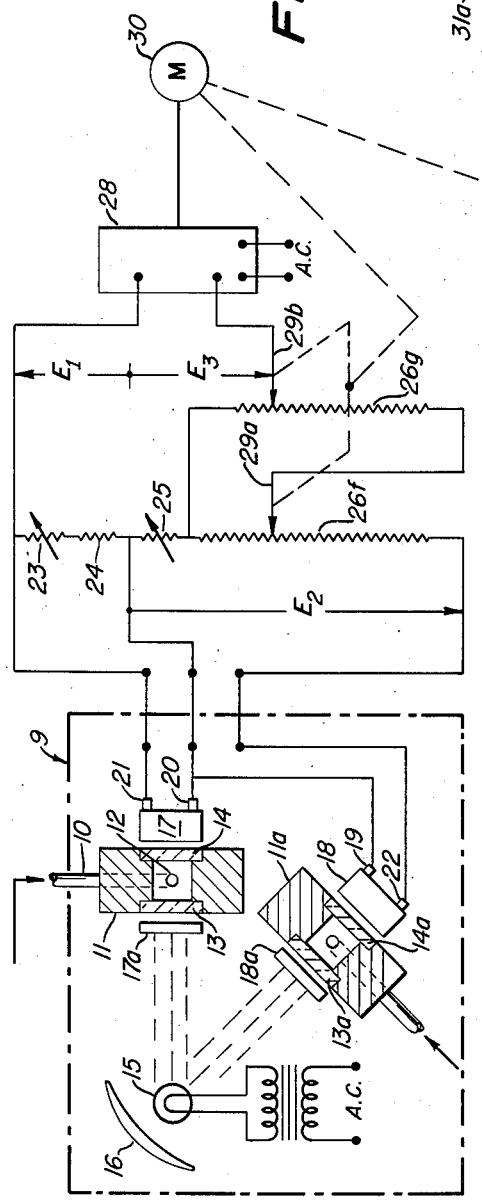
INVENTOR.
Frank A. Leisey
BY
William J. Birmingham
ATTORNEY United States Patent Office 2,967,946
Patented Jan. 10, 1961

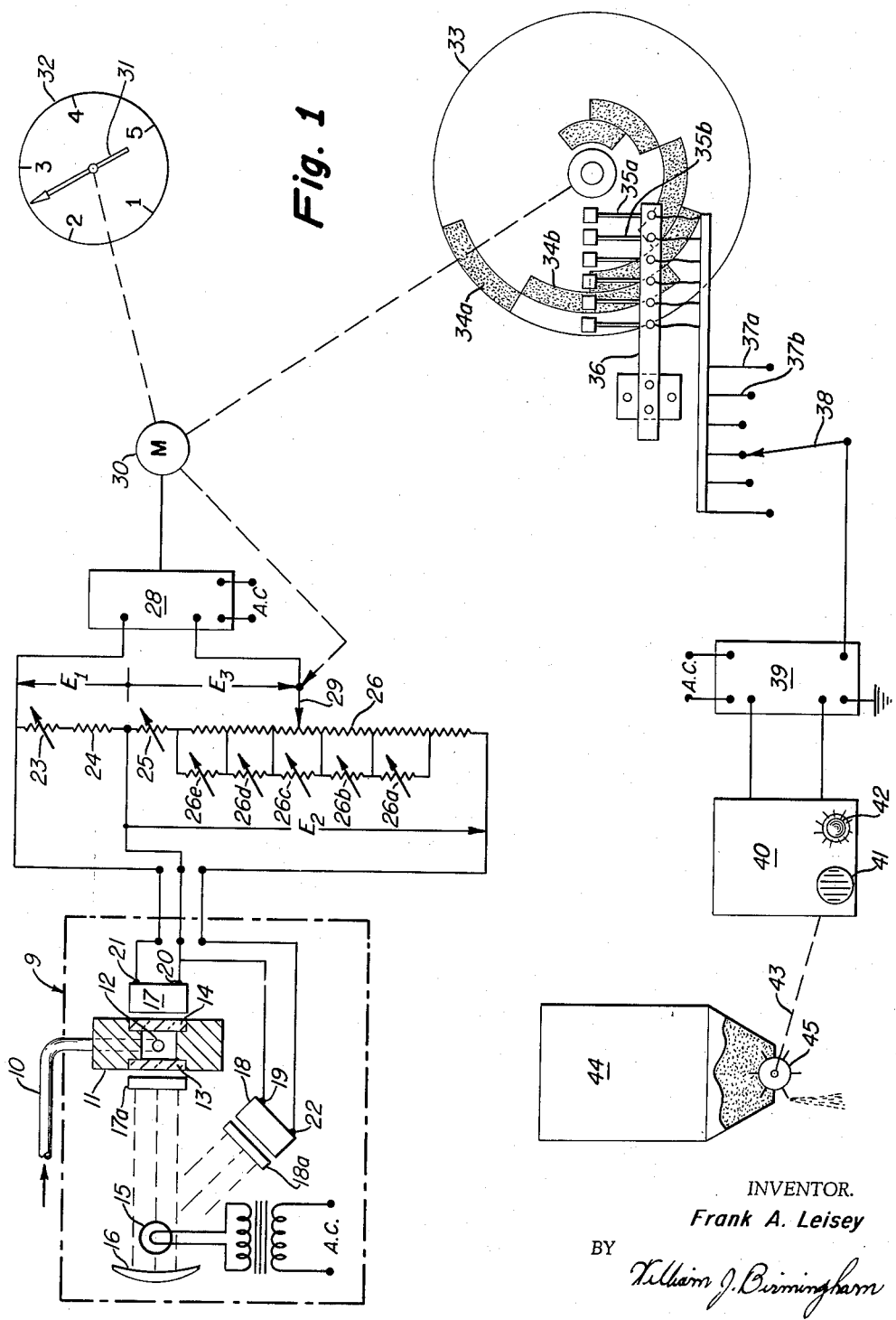

2,967,946

LIGHT TRANSMISSIVITY CONTROL INSTRUMENT

Frank A. Leisey, Chicago, Ill., assignor to Standard Oil Company, Chicago, Ill., a corporation of Indiana Filed Oct. 31, 1957, Ser. No. 693,666

13 Claims. (Cl. 250—218)

This invention relates to a method and means for the continuous indication and control of the color and/or light transmissivity of light-transmissive substances. More particularly, the invention pertains to a system for monitoring and controlling the light transmissivity of fluid streams within a selected one of a plurality of widely-varying transmissivity ranges.

The color and/or light transmissivity of substances, and particularly fluids, is an important variable in many manufacturing processes and, in particular, the petroleum refining industry. In many instances, the color of a particular petroleum fraction is an indirect indication of its physical and/or chemical properties and/or the degree of refining to which it has been subjected. Also, in the eyes of the purchasing public, color is sometimes used as the measure or index of quality, and thus, from a marketing standpoint, it has become important to control the color of products of various refining processes.

To facilitate such measure of quality, and to standardize petroleum stocks for specification purposes, various color standards have been adopted by the industry, for example, Saybolt Chromometer Color, TAG-Robinson Colorimeter Number, National Petroleum Association (NPA) and ASTM Color Number and the like (see latest edition of "TAG Manual for Inspectors of Petroleum" by C. J. Tagliabue Mfg. Co., Park and Nostrand Avenues, Brooklyn 5, New York). In such systems, numbers or letters have been assigned to certain color standards, and the particular color of a given sample determined by visual comparison with said color standards. Such visual color comparison, however, does not lend itself readily to automatic process control.

Devices have, of course, been developed for automatic process control which utilize light transmissivity as a measure of color. Unfortunately, the relationship between color standards and light transmissivity is grossly non-linear. For example, it has been discovered that the relationship of NPA Color and light transmissivity roughly approximates an inverse exponential function. Thus, a petroleum product having an NPA color of 1 transmits about 128 times more light than a petroleum stock having an NPA color of 8. As a result, light-transmissivity control apparatus designed to control or measure one range of color can not readily be adapted for other ranges and still have the same degree of accuracy and sensitivity.

It is therefore an object of the present invention to provide a simple and inexpensive method and means for measuring and controlling with uniform accuracy and sensitivity color of light-transmissive substances over various ranges, including overlapping ranges, wherein the color and/or light transmissivity covered by any particular range may differ greatly from other ranges. A further object of the present invention is to provide a light-transmissivity measuring and control apparatus which indicates and controls linearly in terms of color, e.g., NPA Color. A still further object is to provide a color control and alarm apparatus dependent on light transmissivity which is linearly responsive to non-linear ranges of light transmissivity. A further object is to provide a control instrument which is adapted to the automatic and continuous control of the color and/or light transmissivity of the feed, intermediate product, product, and/or by-products of chemical processes. These and other objects of the present invention will be apparent as the detailed description proceeds.

Briefly, in one embodiment, my invention comprises in combination a light transmissivity comparison device, said device providing a signal which varies with the light transmissivity of a fluid sample; a self-balancing potentiometer system with motor drive responsive to said signal, the response of said motor drive being adjustably non-linearizable with respect to said signal; a movably-mounted carrier, which is movable in accordance with said response of said motor drive; a plurality of strips positioned so that each of said strips would contact said carrier at least at some point in its movement, each strip corresponding to a predetermined light transmissivity range; and an electrical circuit including a plurality of contacts connectable with said strips, whereby said electrical circuit may actuate control means.

The expression "adjustably non-linearizable," in connection with the response of the motor drive, means that the self-balancing potentiometer is designed so that the motor drive can be adjusted to respond according to any selected function of the signal from the light transmissivity comparison device. Thus, where the relationship between light transmissivity and a standard color system is non-linear, as is normally the case, the motor drive can be adjusted to respond linearly with respect to color. This permits use of color indicators which are linear throughout the scale. Furthermore, with the control and alarm components (i.e., the carrier, strips, electrical circuit, and control means) responsive to the motor drive, these components likewise are linearized with respect to color, thus assuring the same accuracy and sensitivity throughout the color scale.

The movably-mounted carrier may be, for example, a body member with at least one electrical contact surface, a rotatable circular disc, a rotatable cylinder, or the like. In each case, the carrier is moved or rotated in accordance with the response of the motor drive. In the embodiment wherein the carrier may comprise a body member with at least one contact surface, movement of the body member brings its contact surface in contact with one or more of said plurality of strips. In this embodiment the contacts of the electrical circuit are fixedly connected to said strips. In the embodiment wherein said carrier may comprise a circular disc or cylinder, the plurality of strips may be mounted on the disc or cylinder and the plurality of contacts are in the path of said strips. Thus, as the disc or cylinder is rotated, the contacts of the electrical circuit contact one or more of the strips. The control means is actuated as movement or rotation of the carrier makes or breaks the electrical connection of said carrier, the selected one of said strips, and the electrical circuit. Indicator means, such as a dial or a conventional permanent recording device, which reads directly in light transmissivity or in correlated color, may also be included and may, conveniently, be powered directly by the motor drive of the self-balancing potentiometer, or by movements of the carrier.

In a particular embodiment, the light transmissivity comparison device of my apparatus may also include inlet and outlet connections whereby a continuous stream of the sample being monitored may be passed through the device. The control means would then automatically respond to any change in the light transmissivity outside the desired range. The response may be in the form of an alarm system, e.g., warning light and/or audio signal, or may be an adjustment to the process being monitored whereby color is again brought back to the desired range.

Further details and advantages of the present invention will be described hereinafter in conjunction with illustrations of the present invention in the accompanying drawings wherein:

Figure 1 is a schematic diagram of a preferred embodiment of the present invention which is used to control and monitor the color of lube oil stocks, and wherein the carrier is a rotatable circular disc;

Figure 2 is another embodiment of the present invention using alternate components to those of Figure 1, wherein the carrier is a rotatable circular cylinder; and Figure 3 shows a further alternate for the carrier, i.e., a body member with at least one contact surface, which may be used in place of the circular disc or cylinder shown in the embodiments of Figure 1 or Figure 2 respectively.

Referring to Figure 1, a fluid sample, i.e., a liquid or gas, e.g., a hydrocarbon lube stock, is continuously fed via pipe 10 to sample cell 11, via inlet 12, and leaves sample cell 11 via an outlet opposite the inlet, which is not shown because of the section view of the sample cell 11. Sample cell 11 has light-transmissive windows 13 and 14, thus permitting light to pass into the cell, through the fluid sample and out the opposite side of the same cell. Sample cell 11, its inlet and outlet sample connections and lines, and windows 13 and 14 are, of course, designed to withstand the temperature, pressure, corrosivity, and the like of the fluid sample, including customary design safety margins.

Light source 15 and reflector 16 supply the light rays penetrating the sample. The light transmitted through the sample in sample cell 11 impinges on photovoltaic cell 17 (e.g., a General Electric Company PV1). For comparison, light rays from source 15 and reflector 16 also impinge on photovoltaic cell 18, one terminal 19 of which is connected to the like terminal 20 of photovoltaic cell 17. The photovoltaic cells are thus so arranged that the polarity of the voltage from terminal 20 to terminal 21 of photovoltaic cell 17 is the same as the polarity from terminal 19 to terminal 22 of photovoltaic cell 18. The components just described are usually housed in a light-proof and explosion-proof housing (schematically indicated by rectangular box 9) to avoid entry of extraneous light rays and to minimize explosion hazards in dangerous areas.

Current produced by light impingement on photovoltaic cell 17 produces a voltage $E_1$ across variable resistor 23 and resistor 24. Current from photovoltaic cell 18 likewise produces voltage $E_2$ across variable resistor 25 and multi-shunt resistor 26. Photovoltaic cells 17 and 18 are so arranged within the housing that light impingement on photovoltaic cell 18 is sufficient so that voltage $E_2$ is equal to, or greater than, voltage $E_1$ at the point of maximum light transmissivity for the fluid being sampled, e.g., when sample cell 11 is empty. Light impingement on photovoltaic cell 18 is, of course, a function of the distance from light source 15, position of reflector 16, angle of the surface of photovoltaic cell 18 with respect to the light source, percent of cell surface exposed, and the like. Screens, shutters, of filters 17a and 18a may be used for calibration purposes, for filtering out undesired wave lengths, for maximizing sensitivity of the apparatus, for reducing the light level, and the like. For example, when monitoring a continuous sample of hydrocarbon lube stock it has been found advantageous to use light rays falling within the blue-green spectrum (by use of a blue-glass filter) and thereby maximize sensitivity and avoid ultraviolet rays which may cause components of the sample to fluoresce.

One terminal of servo-amplifier 28 is connected to the top of the resistance network, i.e., to the upper part of the variable resistor 23, and thus to terminal 21 of photovoltaic cell 17. The other terminal of servo-amplifier 28 is connected to slide wire 29 on multi-shunt variable resistor 26. Motor drive 30, associated with servo-amplifier 28, drives slide wire 29 until voltages $E_1$ and $E_3$ cancel each other and the net voltage across the terminals of servo-amplifier 28 is zero. Thus, it can be seen that as soon as the light transmissivity of the fluid sample entering sample cell 11 changes, $E_1$ also changes; and servo-amplifier 28 and motor drive 30 readjust the position of slide wire 29 so that $E_1$ and $E_3$ are again equal, and cancel each other. Thus, in summary, the signal from the components within housing 9 varies with light transmissivity of the fluid sample, and the impedance network including the servo amplifier 28 and motor drive 30 provides a self-balancing potentiometer system which is responsive to the signal.

The response of motor drive 30 to changes in the light transmissivity of the sample is made adjustably non-linearizable by means of multi-shunt resistor 26. As previously pointed out, an adjustably non-linearizable response from motor drive 30 is desired so that a linear relationship can be obtained for light-transmissivity ranges which differ greatly from each other. This adjustably non-linearizable response of the motor drive, which results in a linear relationship for greatly-differing light transmissivity ranges, is critical to the operation of the remaining control components as will be described hereinafter.

Indicator means 31 is operatively connected to motor drive 30 and can be made to read directly in the desired color units. In a typical installation indicator means 31 may be an arrow mounted on a shaft extension of motor drive 30 and indicator face 32 may be subdivided into the desired color units.

Circular disc 33, which in this specific embodiment is made of an electrically-conductive material and which is electrically grounded at its center, contains, mounted thereon, a plurality of non-conductive strips 34a, 34b, etc., at varying arcs and varying radii from the axis of said circular disc 33. Each of the strips corresponds to a given light transmissivity range. As desired, these ranges may be overlapping, continuous, or discontinuous. Circular disc 33 is operatively connected to motor drive 30 and is rotated thereby. In a typical installation, circular disc 33 may be mounted on a shaft extension of motor drive 30. While, in Figure 1, strips are mounted on only one side of circular disc 33, it should be understood that strips may be mounted on both sides and thereby increase the number of color ranges that can be monitored.

A plurality of contacts, 35a, 35b, etc., are held in rubbing, sliding, or rolling relationship with respect to circular disc 33 by means of support arm and bracket 36. While the contacts are shown lined up, such is not essential. It should be understood that the contacts could be mounted at various points and the positions of the strips adjusted accordingly. Each of the contacts 35a, 35b, etc., are connected individually to the terminals 37a, 37b, etc., respectively, of a multi-position switch, of which switch arm 38 is the center terminal. Electronic relay 39 is connected to switch arm 38 and thereby, selectively, to any of terminals 37a, 37b, etc., respectively, and thus to contacts 35a, 35b, etc., respectively.

Electronic relay 39 in this embodiment, is so designed that when the terminal connected to switch arm 38 is grounded, the relay is triggered, thereby setting off the alarm and/or control mechanism 40, which may include an audio signal device 41, a warning light 42, and/or a control signal 43, which controls at least one variable of the process being monitored. For example, control signal 43 may control the amount of clay being used in the clay contacting of a lube stock to improve color. Thus, signal 43 might, for instance, control the rate of clay addition from bin 44 to the slurry of clay and lube stock (not shown) by controlling the rate of rotation of star feeder 45.

When the above-described embodiment of my invention is used, for example, to control the NPA Color of lube stocks within selected color ranges, it must first be calibrated. Thus, before a sample enters sample cell 11, a series of standard samples corresponding to known NPA Colors are successively added batchwise to sample cell 11 by means of appropriate connections and valves (not shown) in the inlet and outlet lines. For each standard sample, the appropriate shunt resistance of multi-shunt resistor 26 is adjusted so that the NPA reading of indicator arrow 31 with respect to indicator face 32 corresponds to that particular NPA Color. Thus, for example, with standard sample corresponding to the NPA Color 1 added, shunt 26a is adjusted. Then with standard sample corresponding to NPA Color of 2 added, shunt 26b is similarly adjusted, and so forth. Screens or shutters inserted between light source 15 and photovoltaic cell 17 may also be used for calibration provided the light-transmissivity of the screens or shutter and NPA Color have been previously established. During these calibration adjustments, variable resistors 23 and 25 are, preferably, in mid position. When multi-shunt resistor 26 has been adjusted to the NPA scale as above described, no further adjustments are usually necessary during subsequent operation. Instead, any minor change in calibration can be quickly compensated for by adjusting variable resistors 23 and 25 to give the appropriate minimum and maximum scale readings, respectively.

While only five continuous shunt resistors are shown across resistor 26, it should be understood that the number of shunts can be decreased or increased depending on the color ranges to be used, on the number of calibration points desired, and the like. Furthermore, the particular electrical circuit is for illustration only and other alternate components may be substituted, provided the impedance or resistance can be adjustably varied throughout its range.

Once the instrument is calibrated as described above, the light-transmissive gaseous or liquid sample to be monitored is continuously charged to the sample cell. Switch arm 38 is set on the particular terminal of multi-terminals 37a, 37b, etc., which corresponds to the desired NPA Color range, for example, a NPA Color range of 2.5 to 3.5. One of the non-conductive strips on circular disc 33 corresponds to said NPA Color range. So long as the sample being monitored falls within the selected range, the selected contact of contacts 35a, 35b, etc., rides on top of the non-conductive strip, and thus electronic relay 39, and the control and alarm mechanism 40 are not actuated. If the NPA Color of the sample increases above or decreases below the desired range, circular disc 33 is rotated by motor drive 30 so that the selected contact rides off the insulated strip and on to the conductive surface of circular disc 33, thereby grounding the connected terminal of electrical relay 39 and thus actuating the alarm and/or control mechanism. Adjustments to the process may then be made automatically by control signal 43. Alternatively, audio signal 41 and/or signal light 42 may be used to notify operating personnel to make the necessary process adjustments manually.

When the control apparatus is used to adjust process variables automatically, it is sometimes tied in with the process control so that the error, if any, will always be in a particular direction, i.e., the color is always too light or too dark when the control means is actuated. Thus, when clay contacting lube stocks, a minimum amount of clay is generally used for economy reasons, and any error is usually in the direction of the treated stock being too dark. Where, however, it is essential to discriminate as to whether it is too dark or too light, simple modifications of the present apparatus are used. For example, two like circular discs similar to disc 33, are ganged together on the same shaft. Alternatively, two sides of one disc may be used. Strips on one cover all colors, ranging in darkness, up to the maximum specification darkness in each range. Strips on the other cover all colors ranging in lightness up to the maximum specification lightness in each range. Two like electrical circuits, the same as shown in Figure 1, are then used, one actuating the control means so as to decrease darkness, the other actuating the control means to increase darkness. The multiple position switch for each electrical circuit are preferably ganged together for convenience of design.

In Figure 1 indicator means 31 and circular disc 33 are illustrated as separate components. It is obvious, however, that the mechanism can be designed such that both could be mounted on the shaft of motor drive 30. Alternatively, both functions could be combined on a single disc. Thus, the periphery of circular disc 33 could be extended and indexed and a stationary viewing window located near such periphery. Thus, movements of the indexed periphery of circular disc 33 could be made to indicate changes in color directly. Likewise, if both sides of circular disc 33 are not used for mounting strips, as is the case in Figure 1, the unused side could be indexed appropriately.

While circular disc 33 in this embodiment is constructed of an electrically-conductive material, e.g., aluminum, and strips 35a, 35b, etc., are made of a non-conductive material, e.g., insulating varnish baked thereon, it should be understood that disc 33 could be made of a non-conductive material, e.g., Bakelite, and the strips of a grounded conductive material, e.g., copper. In such an embodiment, electrical relay 39 would actuate alarm and control mechanism 40 when the appropriate terminal and contact is opened, rather than grounded. These and other equivalents are readily apparent to those skilled in the art.

It will be apparent from the above description that without the use of non-linearizing multi-shunt resistor 26, the apparatus herein described would be relatively insensitive and inaccurate at one end of the scale. Thus, the arc corresponding to a NPA Color range of 1 to 2 would have to be about 64 times greater than the arc corresponding to a NPA Color range of 7 to 8. For color standards which are related to light-transmissivity by higher powers than the apparently approximate $(2)^{NPA-1}$ relationship for the NPA Color system, this situation would be further aggravated. The present method and means, however, permits a linear response regardless of the relationship. In the preferred embodiment shown in Figure 1, advantage may also be taken of the fact that strips are mounted at varying radii. Thus, arc lengths of strips corresponding to a particular difference in color can be equalized, if desired, by correlating the radii at which the strips are mounted on circular disc 33 and the adjustments of the multiple shunts, 26a, 26b, etc., across resistance 26.

Another embodiment of the present invention is presented in Figure 2. In this figure, alternate components have been substituted for equivalent components of Figure 1. For example, components enclosed within housing 9 are the same as in Figure 1 except that a second sample cell 11a, similar to sample cell 11, has been placed between light source 15 and photovoltaic cell 18. Thus, with this arrangement, color or light transmissivity differences between two samples can be monitored. In both Figure 1 and Figure 2, use of the same light source for both photovoltaic cells compensates for fluctuations in line voltage, aging of the light bulb, and the like.

In Figure 2 the self-balancing potentiometer system operates in the manner as in Figure 1. To obtain an adjustably non-linearizable response of motor drive 30 with respect to the changes in light transmissivity, a dual helipot is used in place of multi-shunt resistance 26. The dual helipot comprises resistor 26f with slide wire 29a, and resistor 26g with slide wire 29b. The voltage tapped off resistance 26f by slide wire 29a appears across resistor 26g. Both slide wires 29a and 29b are driven by motor drive 30. Thus, a voltage relationship varying up to the second power can be obtained by varying the relative movement, with respect to each other, of slide wires 29f and 29g simultaneously. For a fixed second-power relationship slide wires 29f and 29g may, of course, be ganged on the same shaft. Relationships involving higher powers may also be obtained by use of triple or higher multiple helipots in the same manner.

Instead of circular disc 33 of Figure 1, rotatable cylinder 33a is employed in Figure 2, said cylinder being operatively connected to motor drive 30 as in Figure 1. Strips 34a, 34b, etc., are accordingly mounted on cylinder 33a in the same manner as in Figure 1. Remainder of the alarm and control mechanism may duplicate that already described in connection with Figure 1.

Instead of indicator arrow 31 driven by motor drive 30 as in Figure 1, an indexed circular disc 31a, operatively connected to cylinder 33a, is employed. A stationary marker 32a serves the same purpose as dial face 32 of Figure 1. Of course, indexing of the surface or end of cylinder 33a would eliminate the need for a separate indexed circular disc 31a. Both cylinder 33a and disc 31a may be mounted on the shaft of motor drive 30.

While I have described a number of alternate components, it should be understood that any or all of these alternative components may be substituted in the embodiment described in detail in Figure 1. Still other equivalent components performing the same function are apparent to those skilled in the art.

Another alternative component which may be used in place of the rotatable circular disc 33 of Figure 1 or the rotatable cylinder 33a of Figure 2 is shown in Figure 3. In this embodiment the movably-mounted carrier takes the form of a contact bar 33b which is moved back and forth in accordance with response of motor drive 30. Movement of bar 33b may, of course, actuate a color indicating device; or bar 33b may itself be indexed so as to indicate color. In moving back and forth, the surface of bar 33b comes in contact with strips 34f, 34g, etc., which may take the form of wires, busses, and the like, conveniently supported on a Bakelite frame 34m. The surface of bar 33b may optionally contain a series of rollers or the like to minimize wear resulting from contact with the strips. As in Figures 1 and 2, each strip corresponds to a predetermined light-transmissivity range. In this embodiment plurality of contacts 35f, 35g, etc. are fixedly secured to strips 34f, 34g, etc., respectively. The remainder of the circuit may be the same as described in connection with Figures 1 and 2. In this embodiment, movable contact bar 33b is conveniently grounded, and thus electronic relay 39 is triggered when the circuit is opened, rather than closed.

From the description herein it is apparent that the objects of this invention have been attained. The detailed description, however, of the above embodiments of my invention is intended for the purpose of illustration only. Accordingly, it is contemplated that modifications can be made in the described invention without departing from the scope or spirit of the invention.

Having described my invention, I claim:

1. A control instrument which comprises in combination a light transmissivity comparison device, said device providing a signal which varies with the light transmissivity of a fluid sample; a self-balancing potentiometer system with motor drive responsive to said signal, the response of said motor drive being adjustably non-linearizable with respect to said signal; a movably-mounted carrier, said carrier being movable in accordance with response of said motor drive; a plurality of strips positioned so as to contact said carrier, each strip corresponding to a predetermined light transmissivity range; an electrical circuit including a plurality of contacts connectable with said strips, whereby said electrical circuit may actuate control means.

2. The control instrument of claim 1 wherein said movably-mounted carrier is a body member with at least one contact surface.

3. A control instrument which comprises in combination a light transmissivity comparison device, said device providing a signal which varies with the light transmissivity of a fluid sample; a self-balancing potentiometer system with motor drive responsive to said signal, the response of said motor drive being adjustably non-linearizable with respect to said signal; a movably-mounted carrier which is movable in accordance with said response of said motor drive; a plurality of strips on said carrier, each strip corresponding to a predetermined light transmissivity range; an electrical circuit including contacts in the path of said strips, whereby said electrical circuit may actuate control means.

4. The control instrument of claim 3 wherein said movably-mounted carrier is a rotatable cylinder, said cylinder being rotated in accordance with said response of said motor drive.

5. The control instrument of claim 3 wherein said movably-mounted carrier is a rotatable circular disc, said disc being rotated in accordance with said response of said motor drive.

6. The control instrument of claim 3 including indicator means operatively connected to said motor drive whereby said response of said motor drive is visually recorded.

7. The control instrument of claim 3 wherein said movably-mounted carrier includes indicator means whereby movements of said movably-mounted carrier are visually indicated.

8. A control instrument which comprises in combination a light transmissivity comparison device, said device providing an electrical signal which varies with the light transmissivity of a continuously-flowing fluid sample; a self-balancing potentiometer system with motor drive responsive to said signal, the response of said motor drive being adjustably non-linearizable with respect to said signal; a circular disc which is rotatable in accordance with said response of said motor drive; a plurality of strips on said disc, said strips being of varying arcs and at varying radii from the axis of said disc, each strip corresponding to a predetermined light transmissivity range; an electrical circuit including individual contacts in the path of said strips; and control means actuated by said circuit.

9. The control instrument of claim 8 wherein said light transmissivity comparison device includes inlet and outlet connections whereby a continuous flow of said fluid sample is charged to said light transmissivity comparison device from a treating zone wherein a treating medium is used to adjust the light transmissivity of said fluid sample and said control means includes regulating means for regulating said treating medium.

10. The control instrument of claim 8 wherein said control means includes a warning light.

11. The control instrument of claim 8 wherein said control means includes an audio signal device.

12. A control instrument which comprises a light transmissivity comparison device with inlet and outlet connections for a continuously-flowing fluid stream, said device providing an electrical signal which varies with the light transmissivity of said fluid stream; a self-balancing potentiometer system with motor drive responsive to said electrical signal, the response of said motor drive being adjustably non-linearizable with respect to said signal; a rotatable cylinder, said cylinder being rotatable in accordance with said response of said motor drive; a plurality of strips at spaced intervals on said cylinder, each strip corresponding to a predetermined light transmissivity range; an electrical circuit including contacts in the path of said strips; and control means actuated by said circuit, said control means including a warning signal light and an audio signal device.

13. A control instrument which comprises in combination a light transmissivity comparison device, said device providing a signal which varies with the light transmissivity of a first fluid sample as compared with the light transmissivity of a second fluid sample; a self-balancing potentiometer system with motor drive responsive to said signal, the response of said motor drive being adjustably non-linearizable with respect to said signal; a movably-mounted carrier which is movable in accordance with said response of said motor drive; a plurality of strips on said carrier, each strip corresponding to a predetermined light transmissivity range; an electrical circuit including contacts in the path of said strips, whereby said electrical circuit may actuate control means.

References Cited in the file of this patent

UNITED STATES PATENTS

| | | |
|---|---|---|
| 2,159,181 | Ryder | May 23, 1939 |
| 2,493,543 | Merchant | Jan. 3, 1950 |
| 2,654,845 | Presenz | Oct. 6, 1953 |
| 2,722,156 | Warren | Nov. 1, 1955 |
| 2,769,917 | Crawford | Nov. 6, 1956 |